UNITED STATES PATENT OFFICE.

WILHELM MÜLLER, OF FRANKFORT-ON-THE-MAIN, GERMANY, ASSIGNOR OF ONE-HALF TO HERMANN STEINHÄUSER, OF OFFENBACH-ON-THE-MAIN, GERMANY.

COMPOSITION FOR WATERPROOFING FELT.

SPECIFICATION forming part of Letters Patent No. 571,384, dated November 17, 1896.

Application filed October 16, 1895. Serial No. 565,893. (No specimens.) Patented in Germany June 9, 1894, No. 82,216; in England March 5, 1895, No. 4,798; in Belgium March 8, 1895, No. 114,479, and in France March 8, 1895, No. 245,636.

*To all whom it may concern:*

Be it known that I, WILHELM MÜLLER, a subject of the Emperor of Germany, residing at Frankfort-on-the-Main, Germany, have invented an Improvement in Compositions for Waterproofing Felt, &c., of which the following is a specification, and for which I have obtained Letters Patent in Germany, No. 82,216, dated June 9, 1894; in Belgium, No. 114,479, dated March 8, 1895; in France, No. 245,636, dated March 8, 1895, and in England, No. 4,798, dated March 5, 1895.

My invention relates to compositions suitable for treating felt; and it consists in the composition hereinafter set forth and claimed.

In practicing my invention I incorporate together amber, rosin, Venetian turpentine, brown shellac, refined camphor, and sandarac, which mixture is dissolved in benzin and alcohol or a similarly-acting dissolving fluid, or in a mixture thereof. These ingredients are preferably incorporated in the following proportions: one hundred and twenty-five grams rosin, one hundred and twenty-five grams amber, forty-five grams Venetian turpentine, twenty-five grams shellac, two grams camphor, three grams sandarac, three hundred and twenty grams alcohol, one hundred and fifty grams benzin. After the felt has been saturated with this preparation it is taken out of the solution, the surplus liquid is allowed to drop off, and the material thus prepared is finally allowed to dry in the air. By this means I produce a material useful in many situations where besides durability a certain amount of lightness and strength is required, as for instance, as a lining for horseshoes, as brake-shoes in brakes, as shoe-soles, &c., and presents many advantages by reason of its durability. This material has many other advantages. For instance, when used for horseshoe-lining its water-tight properties prevent the penetration of moisture, thus keeping the hoof dry, and has the further advantages of great lightness and elasticity, which insure a very secure footing for the horse in all gaits and over any paving.

What I claim, and desire to secure by Letters Patent, is—

The herein-described new and useful waterproofing compound consisting of amber, rosin, Venetian turpentine, brown shellac, refined camphor and sandarac in benzin and alcohol or other suitable solvent.

WILHELM MÜLLER.

Witnesses:
ALVESTO S. HOGUE,
JEAN GRUND.